No. 718,179. PATENTED JAN. 13, 1903.
J. L. VOIGT.
EGG SEPARATOR.
APPLICATION FILED MAR. 3, 1902.
NO MODEL.
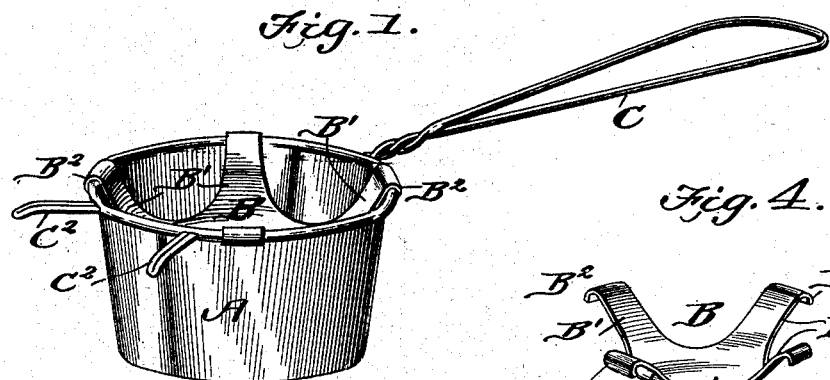
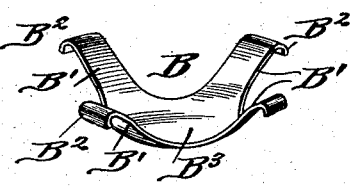
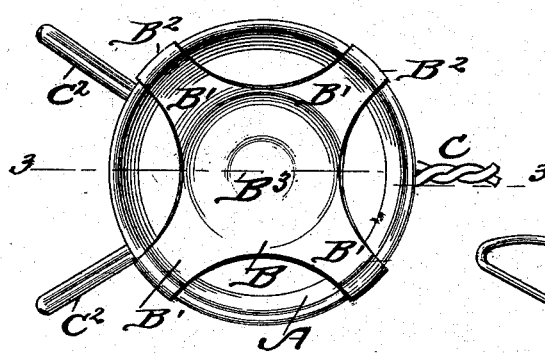
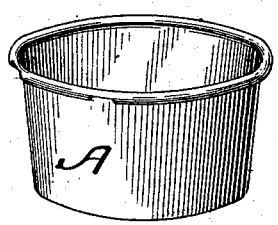
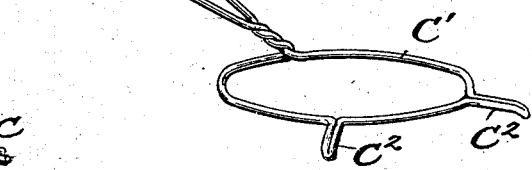
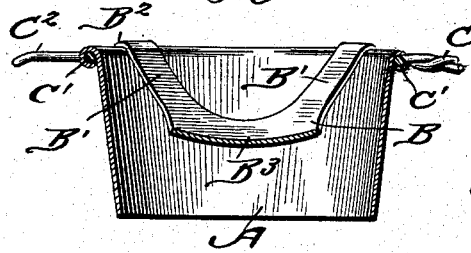
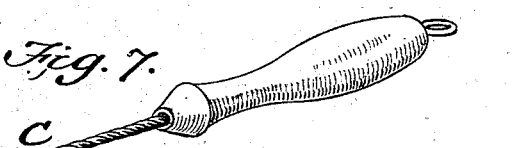

UNITED STATES PATENT OFFICE.

JULIUS L. VOIGT, OF SHEBOYGAN, WISCONSIN.

EGG-SEPARATOR.

SPECIFICATION forming part of Letters Patent No. 718,179, dated January 13, 1903.

Application filed March 3, 1902. Serial No. 96,533. (No model.)

*To all whom it may concern:*

Be it known that I, JULIUS L. VOIGT, a citizen of the United States, residing at Sheboygan, in the county of Sheboygan and State of Wisconsin, have invented a new and useful Egg-Separator, of which the following is a specification.

This invention is an improved construction of egg-separator, the object being to provide an exceedingly simple and highly efficient device whereby the yolk of the egg may be separated from the white; and with this object in view the invention consists, essentially, of a ring having a suitable handle connected thereto and supporting a plate, the central portion of which is depressed and the arms or outwardly-projecting portions shaped to engage the ring and by means of which the plate is suspended within the said ring.

The invention consists also in certain details of construction and novelties of combination, all of which will be fully described, and hereinafter pointed out in the claims.

In the drawings forming a part of this specification, Figure 1 is a perspective view of an egg-separator constructed in accordance with my invention. Fig. 2 is a top plan view of the separating portion of the device, the handle being omitted. Fig. 3 is a vertical sectional view taken on the line 3 3 of Fig. 2. Fig. 4 is a detail perspective view of the plate. Fig. 5 is a similar view of the ring. Fig. 6 is a perspective view of the handle or holder, and Fig. 7 is a detail perspective view illustrating a slightly-modified form of construction.

In carrying out my invention I employ a ring or band A, which is preferably made of sheet metal and tapers slightly toward its lower end. Supported within said ring is a plate B, said plate having radial arms B', the ends of which are bent over the upper edges of the ring A, as shown at $B^2$, and the central portion of this plate is depressed, as most clearly shown at $B^3$. It will be noted that there is ample space between the edges of the plate and the ring for the white of the egg to escape through, it being understood that the yolk and white together are deposited in the depressed central portion of the plate B.

In order to hold and support the rim or band A with the separating-plate therein, I employ a handle C, to which the ring C' is connected, said ring surrounding the upper portion of the band or rim, the upper edge of said band or rim being rolled over the said ring C', as most clearly shown in Fig. 3, thereby securely connecting the said handle to said rim or band, and the ring C' is formed with the integral radial supporting-fingers $C^2$, which are adapted to rest upon the edge of the bowl or cup, while the handle portion C is adapted to rest upon the opposite side of the said cup or bowl, thereby holding the separator in the proper position while the eggs are being broken and dropped into the separating-plate. If necessary, a slight vibration can be given to the separator by shaking the handle, thereby facilitating the separating operation.

In Fig. 1 I have shown the handle-ring and supporting-fingers formed from a single piece of wire, whereas in Fig. 7 a slightly-modified form of construction is employed, in which the supporting-fingers, ring, and handle are made in separate parts; but the arrangement and operation are identically the same. It will thus be seen that I provide an exceedingly cheap, simple, and efficient construction of egg-separator.

Having thus fully described my invention, what I claim as new, and desire to secure by Letters Patent of the United States, is—

1. An egg-separator comprising a collar or band, and a plate supported thereon, said plate being centrally depressed and provided with a plurality of arms adapted to clasp or engage a bead on the upper edge of said collar or band, thus securing said plate to said collar or band.

2. An egg-separator comprising a downwardly-tapering collar or band, the upper portion of which embraces a ring having a handle, and a centrally-depressed plate having radially-disposed arms adapted to clasp the upper edge of the collar or band, said arms being formed integral with said plate.

3. An egg-separator comprising a tapering collar or band a centrally-depressed plate having supporting-arms clasping the upper edge of said collar or band, and a ring clasped by the upper portion of said collar or band, and having a handle secured thereto, and the supporting-fingers also secured to the said ring.

4. An egg-separator, comprising a collar or band, having a bead upon its upper edge, a plate having radial supporting-arms adapted to clasp said bead, a handled ring provided with supporting-fingers, and notches or recesses adapted to receive said fingers.

JULIUS L. VOIGT.

Witnesses:
F. H. DENISON,
GEO. P. STERK.